A. J. MILLER, Jr.
WIRE STRETCHER.
APPLICATION FILED MAY 29, 1915.
1,173,368. Patented Feb. 29, 1916.
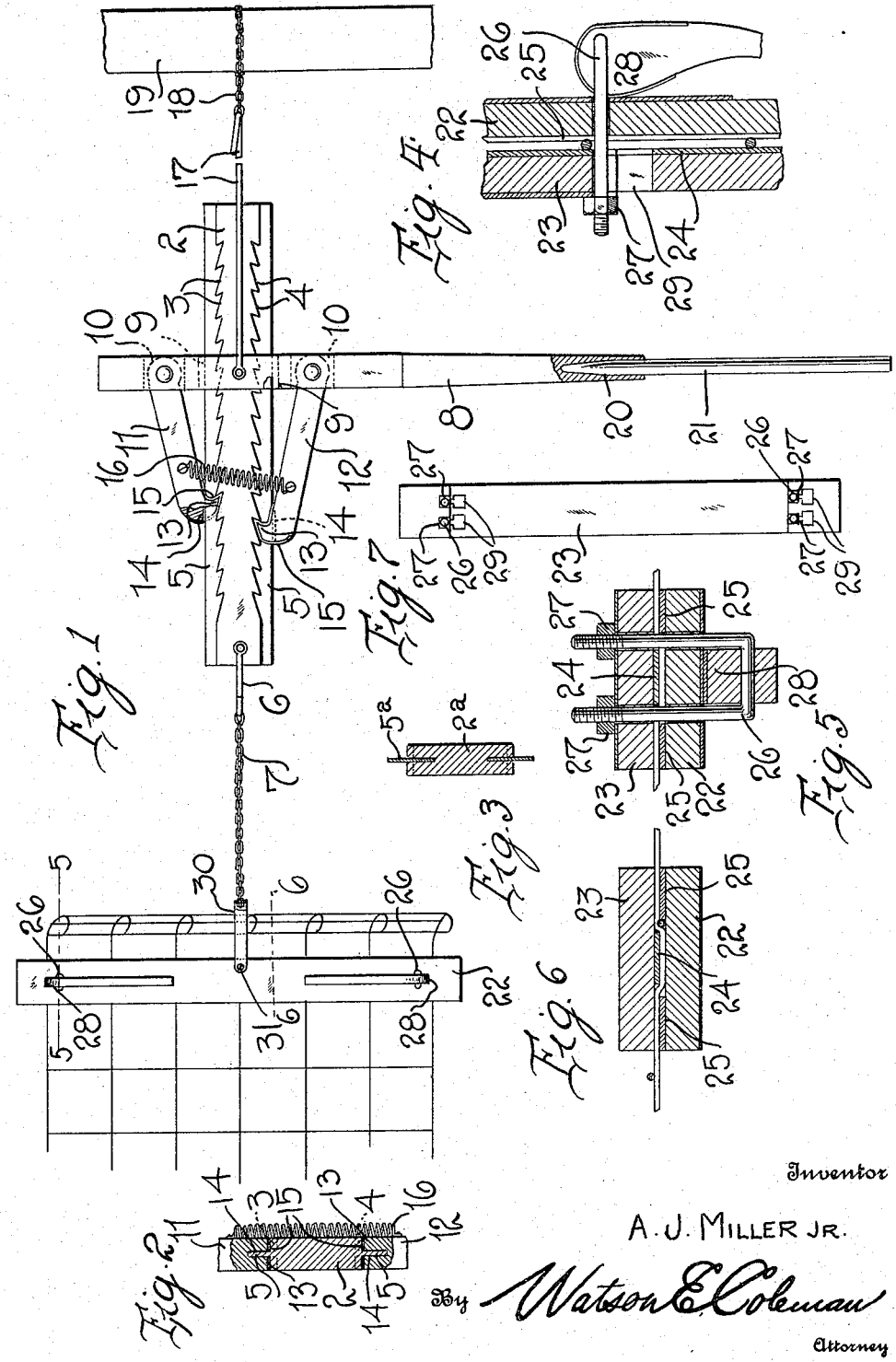
Inventor
A. J. MILLER JR.
By Watson E. Coleman
Attorney

UNITED STATES PATENT OFFICE.

ANDREW JACKSON MILLER, JR., OF BROXTON, GEORGIA.

WIRE-STRETCHER.

1,173,368.  Specification of Letters Patent.  Patented Feb. 29, 1916.

Application filed May 29, 1915. Serial No. 31,216.

*To all whom it may concern:*

Be it known that I, ANDREW J. MILLER, Jr., a citizen of the United States, residing at Broxton, in the county of Coffee and State of Georgia, have invented certain new and useful Improvements in Wire-Stretchers, of which the following is a specification, reference being had to the accompanying drawings.

My invention relates to wire tighteners or strainers, and particularly to that class of wire tightener or strainer wherein a rack is used and a lever provided with pawls adapted to engage said rack by a step by step movement.

One object of my invention is the provision of a very simple mechanism of this character wherein the parts are braced against relative lateral strain and wherein the parts cannot readily bind or otherwise get out of order.

A further object of the invention is to provide a very simple clamp for engaging a section of wire fence where the device is to be applied to straining or tightening a panel fence.

A further object of the invention is to improve upon wire tighteners of this character by causing the pawls of the lever to have an interlocking engagement with the ratchet rack bar so as to prevent relative lateral movement of the rack bar and the pawls.

Other objects will appear in the course of the following description.

My invention is illustrated in the accompanying drawings, wherein:

Figure 1 is a side elevation of my wire fence straining device in applied position; Fig. 2 is a detailed vertical section through the ends of the pawls and through the rack bar; Fig. 3 is a vertical section through the rack bar showing another manner in which it may be formed; Fig. 4 is a fragmentary longitudinal section through the clamping bars; Fig. 5 is a section on the line 5—5 of Fig. 1; Fig. 6 is a section on the line 6—6 of Fig. 1; Fig. 7 is a face view of the clamping member 23.

Referring to these drawings it will be seen that my mechanism comprises a rack bar 2. This bar may be made of any suitable material and is formed upon opposite faces with the ratchet teeth 3 and 4. Extending outward from the middle of the toothed faces is a web or flange 5 which may be formed integral with the rack bar or may be strips inserted in kerfs formed in the rack bar. One end of the rack bar is provided with a clevis 6 to which a chain or other connection 7 may be attached.

Coacting with the rack bar is a lever 8 formed with a slot 9 for the passage of the rack bar. Above and below the slot or opening 9 are slots 10 within which are pivoted the upper and lower pawls or claws 11 and 12, respectively. Each of these pawls at its extremity is formed with a reëntrantly inclined tooth 13 adapted to engage with the ratchet teeth on the edges of the rack bar, and the free end of each pawl is cleft, as at 14, to accommodate and engage over the corresponding web or flange 5 as illustrated in Fig. 2. Preferably the toothed end of each pawl, if the pawls are made of wood or like relatively soft material, is covered with a lining of metal, designated 15, so as to protect the teeth from wear and breakage. The free ends of the pawls are urged toward the rack bars by means of contractile spring 16, which, at its ends, is connected to the pawls. Pivotally mounted upon the lever opposite the middle of the slot 9 and therefore opposite the longitudinal axis of the rack bar is a bail 17 which extends rearward a distance sufficient to accommodate the rack bar when the rack bar has been fully moved rearward, and this bail is adapted to be connected to an anchoring chain or connection 18 in turn adapted to be connected to an anchor 19 of any suitable construction. This anchor might be a tree or post or any other suitable fixed object. The handle end of the lever 8 is socketed, as at 20, to receive an extension handle 21 whereby the leverage may be increased.

Coacting with the rack bar is a clamp which is composed of the two opposed confronting members 22 and 23. The member 23 upon its inside face is formed with a medially disposed longitudinally extending rib 24 slightly raised from the inner face of the member, while the inner face of the opposite member 22 is provided with the longitudinally disposed laterally spaced ribs or elevated portions 25 so that when these clamp members are brought together the margin of the wire fence gripped by said members or the ends of the wires gripped thereby will be bent so that they cannot slip through the clamps.

Passing through the member 22 at the upper and lower ends of the same, or at a greater number of points depending upon the length of these clamping members, are the U-bolts 26. These U-bolts are screw threaded at their ends for the reception of nuts 27. Pivotally mounted upon the middle of each U-bolt and coacting with the outer face of the clamping section 22 are the cams 28 having prolonged handles. When these cams are turned in one position they will apply strain upon the U-bolts and in the other position they will relieve strain thereon. The section 23 of the clamp is provided on its upper and lower ends with the key hole slots 29 adapted to receive the bolts 26. When it is desired to remove the clamping section or member 23 from the clamping member 22, the clamping cams are released and then the member 2 may be shifted vertically so as to bring the enlarged portions of the key hole slots into alinement with the nuts 27, whereupon the two sections may be entirely separated. In normal or clamping position, however, the shanks of the bolts are of course disposed in the contracted portions of the key hole slots. A U-shaped spring clevis 30 embraces the clamping members and is held thereto by a transverse pin 31 passing through the clamping members. The outer end of this clevis is adapted to be connected to the chain or other connection 7.

It will be seen that my clamping device may be readily disposed upon a section of wire fence or in connection with the ends of the wire to be strained, and after the nuts have been adjusted to the proper position the cams may be turned up causing the clamping member to grip the wire tightly. Assuming that the bail 17 of the lever 8 has been connected to the anchor 19 and that the chain 7 has been connected to the clevis 30, then upon an oscillation of the lever the rack bar will be caused to move rearward straining the wires or panels of fence clamped by the clamping members 22 and 23. When the rack bar has been moved rearward as much as possible, the connection 7 may be reduced in length and the rack bar again moved forward and the operation repeated until proper strain has been applied to the wires or fence.

It will be seen that by the provision of webs 5, I prevent the strain on the rack bar from tending to shift the rack bar out of engagement with the pawl, and that the pawls and the rack bar can be almost held in their proper position for firm engagement throughout the whole extent of the coacting teeth.

My invention is simple, has been found very effective in practice, may be readily taken apart to permit the device to be packed for transportation, and may be readily repaired.

In Fig. 3 I show the rack bar 2ª as provided with strips 5ª inserted therein to form the projecting flanges over which the bifurcated ends of the pawls engage.

Having described my invention, what I claim is:—

1. In a wire tightening device of the character described, a rack bar having ratchet teeth on opposed faces, a lever embracing the rack bar, an anchoring device pivotally connected to the lever in line with the middle of the rack bar, and upper and lower spring actuated pawls mounted upon the lever respectively above and below the rack bar, each of said pawls and the rack bar having one a flange and the other a recess in which said flange projects to prevent lateral movement of the pawls with relation to the rack bar.

2. In a device of the character described, a rack bar having ratchet teeth on opposite faces and having medially disposed projecting webs intersecting said teeth, a lever embracing the rack bar, pawls pivotally mounted upon the lever, the ends of said pawls being cleft to receive said webs.

3. In a device of the character described, a rack bar having oppositely disposed ratchet teeth on opposite faces, each of the toothed faces of the bar being provided with a medially disposed web intersecting said teeth and projecting beyond the teeth, a lever having a slot through which the rack bar passes, oppositely disposed pawls pivoted to the lever, the pawls and reëntrant teeth adapted to engage the corresponding teeth of the rack bar, each of said pawls being cleft to accommodate the outwardly projecting web, a spring urging the free ends of the pawls toward each other, a bail pivotally connected to the lever midway of said slot and adapted to be connected to an anchor, the rack bar being provided with a connection adapted to be operatively engaged with the article to be strained.

In testimony whereof I hereunto affix my signature in the presence of two witnesses.

ANDREW JACKSON MILLER, Jr.

Witnesses:
G. W. CORBITT,
E. L. MOORE.